(12) United States Patent
Zhang et al.

(10) Patent No.: US 8,073,559 B2
(45) Date of Patent: Dec. 6, 2011

(54) MATERIAL TRANSPORT SYSTEMS USING AUTONOMOUS CONTROLS

(75) Inventors: Han Zhang, Beverly, MA (US); James McLane, Beverly, MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 153 days.

(21) Appl. No.: 12/142,438

(22) Filed: Jun. 19, 2008

(65) Prior Publication Data

US 2009/0319073 A1 Dec. 24, 2009

(51) Int. Cl.
*G06F 19/00* (2006.01)
*G05B 15/00* (2006.01)

(52) U.S. Cl. ......... 700/121; 700/112; 700/245; 700/258

(58) Field of Classification Search ............ 700/99–102, 700/108–110, 121, 112, 245, 247–249, 253, 700/255; 702/81–84; 438/5, 8
See application file for complete search history.

(56) References Cited

U.S. PATENT DOCUMENTS

| | | | | |
|---|---|---|---|---|
| 4,027,246 A * | 5/1977 | Caccoma et al. | ............ | 700/121 |
| 4,395,757 A * | 7/1983 | Bienvenu et al. | ............ | 718/104 |
| 5,076,205 A * | 12/1991 | Vowles et al. | ................. | 118/719 |
| 5,216,613 A * | 6/1993 | Head, III | ...................... | 700/102 |
| 5,930,138 A * | 7/1999 | Lin et al. | ...................... | 700/108 |
| 6,240,329 B1 * | 5/2001 | Sun | .............................. | 700/110 |
| 6,467,605 B1 * | 10/2002 | Head, III | .................. | 198/341.07 |
| 6,790,686 B1 * | 9/2004 | Purdy et al. | ..................... | 438/14 |
| 7,155,551 B2 * | 12/2006 | Kolinummi et al. | .......... | 710/200 |
| 7,218,985 B2 * | 5/2007 | Naya et al. | ..................... | 700/121 |
| 7,324,863 B2 * | 1/2008 | Thirumalai et al. | .......... | 700/110 |
| 7,363,472 B2 * | 4/2008 | Stuttard et al. | ................ | 712/225 |
| 2006/0155414 A1 * | 7/2006 | Naya et al. | .................... | 700/121 |

OTHER PUBLICATIONS

Paulo Leitao, Agent-based distributed manufacturing control: A state-of-the-art survey, Engineering Applications of Artificial Intelligence, vol. 22, Issue 7, Distributed Control of Production Systems, Oct. 2009, pp. 979-991.*

Monch et al., 2003 L. Monch, M. Stehli and J. Zimmermann, FABMAS: an agent-based system for production control of semiconductor manufacturing process. In: V. Marík, D. McFarlane and P. Valckenaers, Editors, Holonic and Multi-Agent Systems for Manufacturing. Lecture Notes in Artificial Intelligence vol. 2744, Springer, Heidelberg (2003), pp. 258-267.*

Daeyoung Chung, Chankwon Park, Sukho Kang, Jinwoo Park, Developing a shop floor scheduling and control software for an FMS, Computers & Industrial Engineering, vol. 30, Issue 3, IE in Korea, Jul. 1996, pp. 557-568.*

* cited by examiner

Primary Examiner — Dave Robertson (57) ABSTRACT

A plurality of autonomous control processes, with each controlling one or more components of the material transport (or processing) system, is used to radically simplify the controller software. Each autonomous control process is responsible for the actions of only a subset of the cluster tool components. For example, in one embodiment, a separate autonomous control process is used to control each automated component in the material handling system. However, other embodiments in which a control process controls a plurality of components are also contemplated.

22 Claims, 5 Drawing Sheets

FIG. 1. Wafer Transport System Diagram

FIG 2. Simplified Wafer Transport System

MATERIAL TRANSPORT SYSTEMS USING AUTONOMOUS CONTROLS

BACKGROUND OF THE INVENTION

Semiconductor wafers are commonly used to create integrated circuits. To transform a wafer into an integrated circuit, a sequence of process steps must be performed on the wafer. These steps are performed using a plurality of processing chambers, each performing one or more specific functions on the wafer. The wafers are moved between the various chambers through the use of one or more robots. In addition, there are components that properly orient the wafers, others that allow wafers to be passed between robots and load locks. This collection of chambers, orientors, pass-through mechanisms, load locks and robots is commonly referred to as a cluster tool.

A Cluster Tool is one example of a Material Transport and Processing System, which transports and processes Materials, such as wafers, in one or more Process stations using a plurality of components including robots, pass-through mechanisms, load locks and others.

In many embodiments, a portion of the cluster tool, including the processing chambers, is maintained in a vacuum state, while the remainder of the cluster tool, including the factory interface or load area, is maintained at normal atmospheric pressure. This configuration requires an interface between these portions, which is commonly referred to as a load lock. The load lock is a specialized chamber, having passageway to both portions, which can be sealed and pressurized as required. Thus, when a wafer is placed in the load lock from the load area, the load lock closes, and pumps down the interior of the load lock to the required vacuum condition, and then opens the passageway into the vacuum portion of the cluster tool. Similarly, as processed wafers exit the cluster tool, the wafer enters the load lock, which is then closed, the chamber is vented to restore normal atmospheric pressure to the load lock and the passageway to the load area is then opened.

In most embodiments, there is a need to have a robot located within the vacuum area to move the wafers between the various chambers. There is also a need to have a robot in the load area to accept new wafers and transfer them to the load lock, and to remove processed wafers from the load lock and return them to the factory interface.

Furthermore, to improve efficiency, wafers are typically processed concurrently, rather than in a serial fashion. Assume a cluster tool has three chambers. If the wafers are processed serially, the first wafer must be processed by all three chambers before a second wafer enters the cluster tool. However, it is most efficient that there be a wafer in each of these three chambers. Thus, once the first wafer has exited the first process chamber and entered the second process chamber, it is desirable to place the second wafer into the first process chamber. Similarly, once the first wafer exits the second chamber, it should enter the third chamber, while the second wafer enters the second chamber and the third wafer enters the first chamber.

Obviously, there is a need to control the flow of these concurrently processed wafers. The movement of the wafers is controlled by the actions of the various robots. Currently, the actions of these various robots are controlled via a single control process. The term "control process" encompasses multiple embodiments, with the requirement that the control process is able to monitor and control the activities of one or more components within the cluster tool. Therefore, this control process can be a dedicated software program executing on a dedicated computer, or a software program executing on a general-purpose computer designed to control the equipment. Alternatively, the control process can be executed on a special purpose machine, specially designed for this purpose. In another embodiment, a control process can run on a computing device that is shared with other similar or dissimilar processes. While the control process is typically a software program executing on a computing device, this is not a requirement. For example, the control process can be a specialized semiconductor component, designed specifically to execute the rules and algorithms described herein.

Currently, a single control process monitors and controls the actions of the various robots, load locks and any other automated equipment used in the cluster tool. In most embodiments, this single control process comprises a software program executing on a dedicated computing platform.

This approach has been highly effective for many years. However, as semiconductor processes continue to become more and more complex, the size and complexity of the associated software has increased by orders of magnitude. When error conditions, sampling requirements, and defect management are considered, the software needed to operate a cluster tool becomes nearly unmanageable. This problem is exacerbated by increases in the number of process steps and process chambers.

A control system for cluster tools that is easily expandable and scalable would be very beneficial. In this way, cluster tools can grow in complexity without the current complication associated with the software.

SUMMARY OF THE INVENTION

The problems of the prior art are eliminated by the system and method of the present disclosure. A plurality of autonomous control processes, with each controlling one or more components of the cluster tool, is used to radically simplify the overall system software. Each control process is responsible for the actions of only a subset of components in the cluster tool. For example, in one embodiment, a separate control process is used to control each automated component in the cluster tool. However, other embodiments in which a control process controls a plurality of components is also contemplated.

The control processes can also be implemented as rules-based machines, determining the proper action based on a set of fixed or programmable rules. Alternatively, the control processes may also execute traditional software algorithms. The control processes are designed such that, together they achieve the process flow and throughput requirements previously achieved via a single process. One of the key advantages of this method are that it is adaptive to changing conditions. This allows optimal performance across a wide range of operating conditions. This system also supports a wide variety of wafer flows where other systems have fixed wafer flows that are not adaptive.

DETAILED DESCRIPTION OF THE INVENTION

Figure 1:
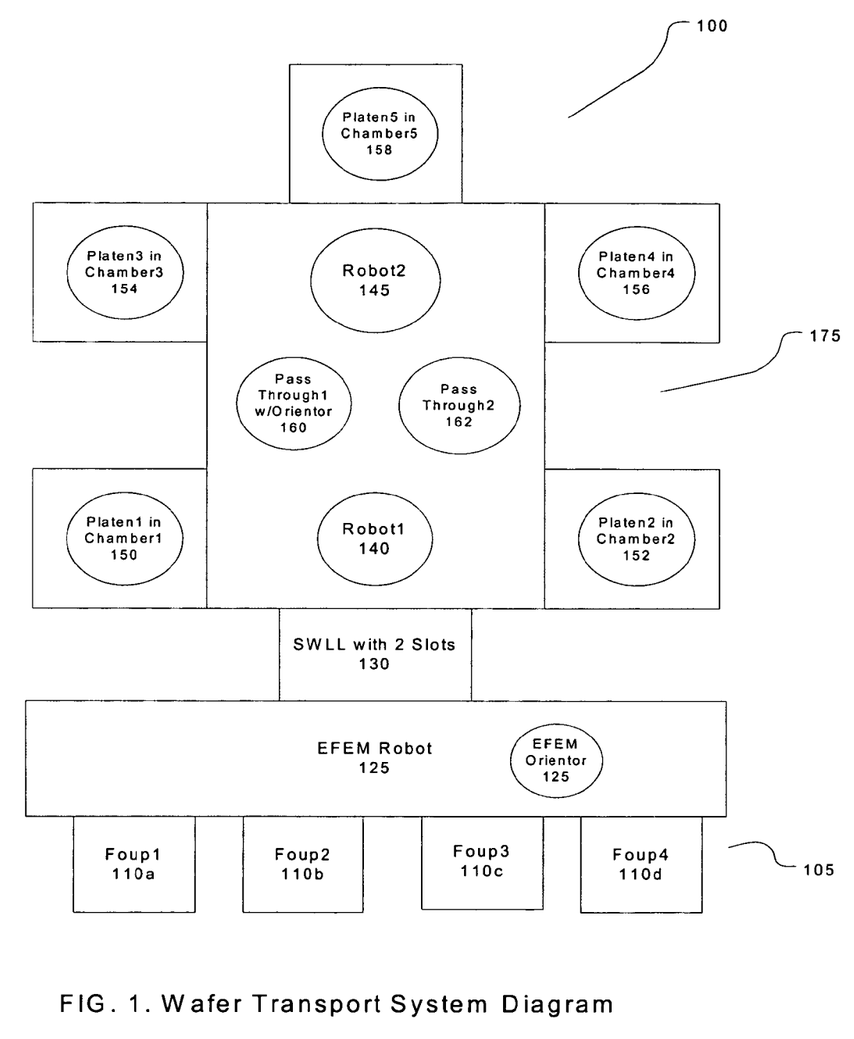
FIG. 1 represents an example of a wafer transport system.

FIG. 1 represents a wafer transport system, as is used for semiconductor processing. The system 100 includes a factory interface 105, where unprocessed wafers enter the system, and processed wafer exit the system. In this embodiment, there are four front opening unified PODS (FOUPS) 110a-d. Each FOUP is a specialized plastic enclosure designed to hold silicon wafers securely and safely in a controlled environment, and to allow the wafers to be removed for processing or measurement. Each FOUP is capable of holding a plurality, typically 25 or more, wafers.

An Equipment Front End Module (EFEM) Robot 120 is used to pick a wafer from one of the FOUPs 110. The robot then places the wafer on the EFEM Orientor 125. The orientor 125 insures that the wafer is properly oriented before future processing. The orientation of a wafer involves rotating the wafer on a pedestal and locating the position of the pre-marked notch (or flat) on the edge of the wafer. While only one orienter is shown, it is contemplated that a plurality of orienters can be employed. Once the wafer is properly aligned, the EFEM robot 120 can deliver it to the cluster tool. As stated above, some portions 175 of the cluster tool are maintained under vacuum. The load lock 130 serves as the interface between the Factory Interface 105 (the FOUPs 110, the EFEM robot 120 and EFEM Orienter 125), which are at atmospheric pressure, and the remaining portion 175 of the system. FIG. 1 depicts a single wafer load lock (SWLL) having two slots. In this embodiment, one slot may be used for unprocessed wafers entering the cluster tool, while the other slot is used for exiting completed wafers. However, other configurations of the load lock are contemplated as well. For example, separate load locks for input and output can be used. Similarly, multiple slot load locks without dedicated functions for each slot can also be used, allowing unprocessed wafers to enter via any slot and processed wafer to exit via any slot.

The SWLL 130 is a chamber that is capable of being vented to normal atmospheric pressure, and pumped down to vacuum conditions. The SWLL 130 opens to both the Factory Interface 105, and the vacuum portion of the cluster tool 175. In practice, once an unprocessed wafer is placed inside the SWLL 130, the chamber is sealed and pumped down to the desired pressure. Once the desired pressure is reached, the SWLL 130 opens on the vacuum side 175 of the system.

A first robot (Robot1) 140 then picks up the unprocessed wafer. In FIG. 1, Robot1 140 has direct access to a first processing chamber (Chamber1) 150, a second processing chamber (Chamber2) 152, a pass-through mechanism (PassThrough1) 160 by which it can transfer wafers to and from a second robot, Robot2, a second pass through mechanism (PassThrough2) 162, and the SWLL 130. The second robot (Robot2) 145 has direct access to the pass-through mechanisms 160, 162, and three processing chambers (Chamber3, Chamber4 and Chamber5) 154, 156, 158. While FIG. 1 shows this configuration, other configurations are also contemplated. For example, there may be more robots, each with access to pass-through chambers and additional processing chambers. Alternatively, the system may include only one robot (Robot1), and have fewer processing chambers. The system described in the present disclosure is scalable and can adapt to any configuration of robots and processing chambers.

Each of the processing chambers 150, 152, 154, 156, 158 performs a specific function to the wafer. Depending on the fabrication requirements of a particular wafer, each processing chamber may be employed, or only a subset of these chambers may be used. Additionally, the fabrication requirements may also dictate the proper sequence of processing chambers to be stepped through by the wafer.

Multiple robots pass wafers by means of pass-through mechanisms, such as PassThrough1 160. Robot1 140 places a wafer on PassThrough1 160. Robot2 145 becomes aware that a wafer is available on PassThrough1 and picks that wafer up. Robot2 145 is then able to place that wafer in the appropriate processing chamber. When the wafer has been processed by all of the required processing chambers accessible to Robot2 145, the robot then places the wafer in PassThrough2 162, so that it can be returned to Robot1 140. Note that in other embodiments, additional sets of pass-through mechanisms can be available so that the wafer can be passed to additional robots.

Having described the various components, a brief description of the operation of the system follows. One or more FOUPS 110 are placed at the Factory Interface. The system is made aware that there are unprocessed wafers available. The EFEM Robot 120 is then activated to pick up a wafer and place it in EFEM Orientor 125, where it is properly oriented for the cluster tool. Once this is complete, the EFEM Robot 120 picks up the oriented wafer and places it in the SWLL 130, once there is a slot available. The system must also be aware of processed wafers appearing in the SWLL. In this case, the EFEM Robot 120 must unload the processed wafer and return it to its FOUP.

Once an unprocessed wafer enters the SWLL 130 and the SWLL load lock is pumped down to the vacuum side of the cluster tool, the system must recognize that the first robot, Robot1 140, must retrieve this wafer and place in it the first processing chamber (Chamber1) 150. Once the unprocessed wafer is removed from the SWLL 130 and the SWLL 130 is vented to the atmosphere side of the cluster tool, the EFEM robot 120 is free to place another unprocessed wafer in the SWLL 130.

The first robot 140 may remove the wafer from the first processing chamber 150 when it is complete and move it to the next processing chamber 152, or in the pass through mechanism 160, according to the processing requirements of the wafer. At this time, the first robot 140 may also remove an unprocessed wafer from the SWLL 130 (if one is available) and place it in the first processing chamber 150.

If a wafer is placed in the pass through mechanism 160, the system must recognize that the second robot, Robot2 140, must pick up the wafer and move it into the next, for example, the third, processing chamber (Chamber3) 154. Once this wafer is processed, the system must direct Robot2 145 to move the wafer to the fourth processing chamber (Chamber4) 156.

As more and more wafers enter the cluster tool, it is possible and perhaps even preferably that every chamber is occupied at a point in time. The system must direct the activities of the various robots and the EFEM robot to maintain maximum throughput, while dealing with error conditions that may occur.

Many systems adopt a philosophy to help direct the flow of wafers through the cluster tool. There are many ways to do this, and the system and method of the present disclosure can be used with any philosophy. For example, one such philosophy is known as feed-first. This algorithm gives highest priority to bringing more wafers into the cluster tool, with the goal of maximizing throughput. In this algorithm, priority is typically given first to removing a wafer from the FOUP, then to placing unprocessed wafers in the SWLL, then to each processing step in sequential order. A second philosophy is known as empty-first. This algorithm gives highest priority to removing wafers from the cluster tool, so as to minimize congestion. Accordingly, priority is typically first given to placing processed wafers back in the FOUP, then to emptying the SWLL, then to each processing step, in reverse sequential order.

As explained above, typically a software program executing on a computing device monitors and coordinated the activities of the various components within the cluster tool.

The present disclosure separates the control of the cluster tool components among a plurality of control processes. In one embodiment, a separate control process is used for each component in the cluster tool. Each control process makes decisions based solely on the information associated with its respective component(s) and any wafers in contact with that component (s). If each control process utilizes algorithms consistent with the other control processes, the entire system will work together to generate the wafer and process flow automatically, as though operated as a single process, without the software complexity associated with such a system.

embodiments, the average latency through the system is to be minimized; in other embodiments, overall system throughput is to be maximized. In other embodiments, a different process characteristic is the most important criteria when defining and prioritizing the rules.

In a further embodiment, the control process executes deterministically, such that these rules are evaluated at fixed time intervals. In one specific embodiment, the rules are evaluated every 50 milliseconds. By evaluating the rules at fixed intervals, throughput can be maximized and delays between decisions can be minimized.

Figure 2:
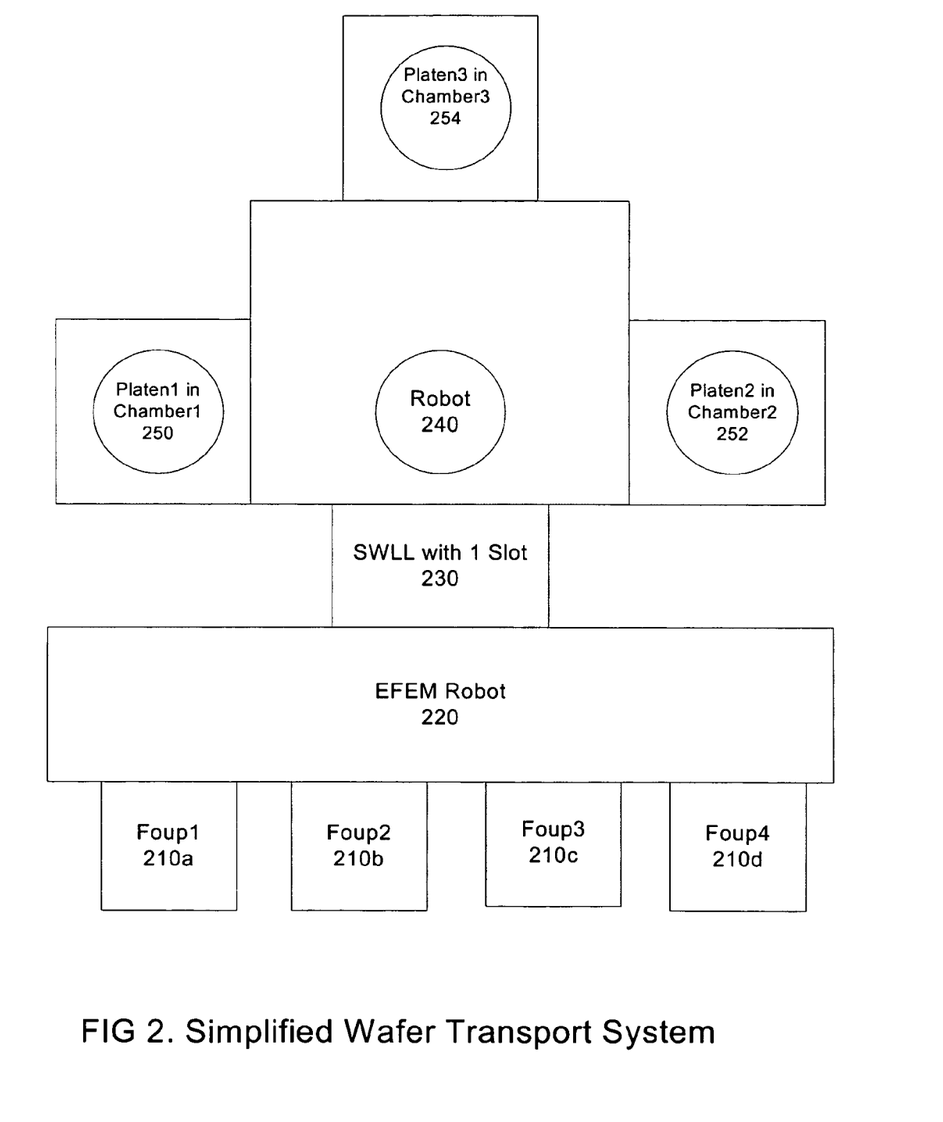
FIG. 2 represents a simpler version of the wafer transport system of FIG. 1.

Consider the simplified system of FIG. 2, having an EFEM robot 220, a SWLL 230, a robot 250 and 3 processing chambers 250,252,254. In this system, there are 5 separate control processes; one for each processing chamber, one for the EFEM robot 220 and one for the Robot 240 and SWLL 230. In addition, there are a number of semaphores that are necessary to insure proper interaction of control processes when interfacing with shared resources. For example, a semaphore exists for the SWLL, and for each processing chamber.

The following chart shows a set of simplified rules for the EFEM robot. In this example, the EFEM robot 220 has two arms, or "picks", and the SWLL 230 has a single slot.

CHART 1

| | | EFEM Robot Rules | | | |
|---|---|---|---|---|---|
| # | Condition 1 | Condition 2 | Condition 3 | Condition 4 | Action |
| 1 | Pick1 has a processed wafer | Pick2 is empty | Blank | Blank | Pick1 to place processed wafer in FOUP, get new wafer |
| 2 | Pick1 has a processed wafer | Pick2 is not empty | Blank | Blank | Pick1 to place processed wafer in FOUP |
| 3 | Pick2 has a processed wafer | Pick1 is empty | Blank | Blank | Pick2 to place processed wafer in FOUP, get new wafer |
| 4 | Pick2 has a processed wafer | Pick1 is not empty | Blank | Blank | Pick2 to please processed wafer in FOUP |
| 5 | SWLL has a processed wafer | Pick1 is empty | Pick2 has an unprocessed wafer | SWLL is vented and available | Pick1 to take wafer from SWLL Pick2 to place unprocessed wafer in SWLL (set/release semaphore while in process) |
| 6 | SWLL has a processed wafer | Pick1 is empty | Blank | SWLL is vented and available | Pick1 to take wafer from SWLL (set/release semaphore while in process) |
| 7 | SWLL has a processed wafer | Pick2 is empty | Pick1 has an unprocessed wafer | SWLL is vented and available | Pick2 to take wafer from SWLL Pick1 to place unprocessed wafer in SWLL (set/release semaphore while in process) |
| 8 | SWLL has a processed wafer | Pick2 is empty | Blank | SWLL is vented and available | Pick2 to take wafer from SWLL (set/release semaphore while in process) |
| 9 | SWLL is empty | Pick1 has an unprocessed wafer | Blank | SWLL is vented and available | Pick1 to place wafer in SWLL (set/release semaphore while in process) |
| 10 | SWLL is empty | Pick2 has an unprocessed wafer | Blank | SWLL is vented and available | Pick2 to place wafer in SWLL (set/release semaphore while in process) |

In a further embodiment, each control process operates using a set of rules, which define and control the actions of the associated component in the cluster tool. These rules are implemented so as to define the actions in a fixed priority order. In other words, if there are a number of possible actions that may be taken by a robot in the cluster tools, the rules will define which is the most important action. Typically, the rules are defined with a specific philosophy in mind. In some The rules set forth in the above chart are considered in the order that they are presented. In other words, if the conditions set forth in the first row of the chart are satisfied, the EFEM robot will execute only that rule. If those conditions are not met, the controller will check the conditions defined in the second row of the chart. This process continues until the control process for the EFEM robot 220 either finds a rule that it can execute and or forced to remain idle. Looking at the order of the rules presented in the above chart, this system implements an empty-first algorithm, as the EFEM robot 220 first checks whether the SWLL 230 has a processed wafer. The last rules involve putting new wafers into the cluster tool. A feed-first algorithm conceptually would reverse the order of these rules, looking first at whether a new wafer can be placed in the SWLL 230.

In this example, the control process for the EFEM robot 220 first checks if the first pick currently has a processed wafer, as shown in Rule #1. If so, this wafer has been completed and can be placed back in the FOUP 210. To insure that deadlock does not occur, the EFEM robot 220 does not pick up another unprocessed wafer with the first pick, unless the second pick is idle. If both picks held unprocessed wafers, and the SWLL 230 had a processed wafer ready to exit, the EFEM robot 220 would be unable to pick up the processed wafer. Thus, the first rule simply states that if the first pick has a processed wafer and the second pick is free, the EFEM robot 220 should place the processed wafer in the FOUP 210 and get a new unprocessed wafer. The second rule states that if the second pick is not free, the EFEM robot 220 should place the processed wafer, but not pick up a new unprocessed wafer. Rules #3 and #4 cause corresponding actions if the second pick is the one with the processed wafer.

The next set of rules is executed only if the EFEM Robot 220 is not currently holding a processed wafer. The system then looks for processed wafers in the SWLL 230. If there is a processed wafer, the EFEM Robot 220 is directed to remove that wafer. If the other pick of the EFEM Robot 220 holds an unprocessed wafer, then the EFEM Robot removes the processed wafer with one pick and places an unprocessed wafer in the SWLL 230 with the other pick. Rule #5 directs the EFEM robot 220 to pick up the processed wafer with the first pick and place an unprocessed wafer in the SWLL 230 with the second pick. Rule #6 simply removes the processed wafer, since the second pick does not have an unprocessed wafer. Rules #7 and 8 perform the corresponding actions if the second pick is free.

The final set of rules is only executed if there are no wafers that are exiting the cluster tool. In this case, the EFEM Robot 220 will place an unprocessed wafer in the SWLL 230. The two rules handle the situation where either pick has an unprocessed wafer. It is important to note that the SWLL 230 is accessed by two different devices, the EFEM Robot 220, and the Robot 240 (which is described below). It is essential to insure that one of these components is not attempting to place a wafer in the SWLL 230 while the other is trying to take a wafer out, since the SWLL 230 must be pressurized differently, depending on which side is accessing it. Thus, a semaphore is used to give one of the two side temporary exclusive control over the SWLL 230 while it is actually accessing the device. Once that device (i.e. EFEM Robot 220 or Robot 240) has completed its action, it releases the semaphore, thereby allowing either side to assume control. In the above chart, all rules that involve the SWLL 230 (i.e. Rules #5-#10) must acquire the semaphore during the time that they are accessing the lock. The semaphore is released once the required operation is completed.

A similar chart showing representative rules for Robot 240 is shown below.

CHART 2

| | | Robot Rules | | | |
|---|---|---|---|---|---|
| # | Condition 1 | Condition 2 | Condition 3 | Condition 4 | Action |
| 1 | SWLL has a processed wafer | Blank | Blank | SWLL is NOT vented, and is available | Vent and Open SWLL (set/release semaphore while in process) |
| 2 | SWLL has an unprocessed wafer | Blank | Blank | SWLL is NOT under HIVAC, and is available | HIVAC and Open SWLL (set/release semaphore while in process) |
| 3 | Robot has a wafer | Wafer is processed | SWLL is empty | SWLL is NOT under HIVAC, and is available | HIVAC and Open SWLL (set/release semaphore while in process) |
| 4 | Robot has a wafer | Wafer is processed | SWLL is empty | SWLL is under HIVAC and is available | Place wafer in SWLL(set/release semaphore while in process) |
| 5 | Robot has a wafer | Wafer is not processed | Chamber1 is empty and wafer is destined for Chamber1 | Chamber1 is HIVAC and available | Place wafer in Chamber1 |
| 6 | Robot has a wafer | Wafer is not processed | Chamber2 is empty and wafer is destined for Chamber2 | Chamber2 is HIVAC and available | Place wafer in Chamber2 |
| 7 | Robot has a wafer | Wafer is not processed | Chamber3 is empty and wafer is destined for Chamber3 | Chamber3 is HIVAC and available | Place wafer in Chamber3 |

CHART 2-continued

Robot Rules

| # | Condition 1 | Condition 2 | Condition 3 | Condition 4 | Action |
|---|---|---|---|---|---|
| 8 | Robot is empty | SWLL has a wafer | Wafer is not processed and the assigned chamber is empty | SWLL is HIVAC and available | Get wafer from SWLL (set/release semaphore while in process) |
| 9 | SWLL has a processed wafer | Blank | Blank | SWLL is NOT vented, and is available | Vent and Open SWLL (set/release semaphore while in process) |
| 10 | SWLL has an unprocessed wafer | Blank | Blank | SWLL is NOT HIVAC and is available | HIVAC and Open SWLL (set/release semaphore while in process) |
| 11 | Robot is empty | Chamber1 has a processed wafer | Blank | Chamber1 is HIVAC and open | Get wafer from Chamber1 |
| 12 | Robot is empty | Chamber2 has a processed wafer | Blank | Chamber2 is HIVAC and open | Get wafer from Chamber2 |
| 13 | Robot is empty | Chamber3 has a processed wafer | Blank | Chamber3 is HIVAC and open | Get wafer from Chamber3 |

This chart shows the various actions that the control process used for Robot 240 can direct. It is important to note that in this embodiment, the control process for Robot 240 also controls the SWLL 230. It is also contemplated that the SWLL 230 can have its own control process and be controlled and operated autonomously. Rules #1-4 and #8-10 involve management of the SWLL 230. The other rules are used to control the actions of the Robot 240.

The first rule directs the system to vent and open the SWLL 230 if there is a processed wafer in it. Similarly, the second rule directs the system to put the SWLL 230 under high vacuum and open it if there is unprocessed wafer in it. The third and fourth rules are used to pass processed wafers out of the cluster tool. In both cases, the Robot 240 has a processed wafer, ready to pass out of the tool. In the third rule, the SWLL 230 is not under high vacuum. Therefore, the system must place the SWLL 230 under high vacuum. The fourth rule is invoked when the Robot 240 has a processed wafer and the SWLL 230 is under high vacuum and available. In this scenario, the Robot 240 places the processed wafer inside the SWLL 230. Note that the SWLL semaphore is used during these four rules, since the EFEM Robot 220 also has the ability to access the SWLL 230.

Rules #5-#7 direct the Robot 240 to place the wafer in the next assigned processing chamber. The identification of the next assigned chamber is described in more detail below. The eighth rule directs the Robot 240 to get an unprocessed wafer from the SWLL 230 if the chamber to which it is next assigned is free and available. This condition is required to prevent deadlock. If the Robot 240 were to pick up the wafer while the assigned chamber was occupied, it would have no way to remove the wafer from the assigned chamber. Thus, the rule requires that the processing chamber that will be used next be available before the wafer is removed from the SWLL 230.

Rules #9 and #10 again control the SWLL 230. In these cases, rule #9 directs the system to vent the SWLL 230 and open it if the SWLL 230 has a processed wafer in it. Conversely, rule #10 directs the system to put the SWLL 230 under high vacuum and open it if the SWLL 230 has an unprocessed wafer in it. Again, these rules require use of the SWLL semaphore.

The final three rules direct the Robot 240 to remove a wafer from a processing chamber when the wafer has been processed and the chamber is available.

Separate control processes can be used to control each processing chamber, or a single control process can be used to control several processing chambers. The chart below shows a simple set of rules that can be employed by a control process for a single processing chamber 250. Like the SWLL 230, these chambers require the use of a semaphore due to the interaction of distinct autonomous control processes. For example, chamber 250 can be accessed by the chamber control process and also by the control process for Robot 240.

CHART 3

Processing Chamber

| # | Condition 1 | Condition 2 | Condition 3 | Condition 4 | Action |
|---|---|---|---|---|---|
| 1 | Processing Chamber has a wafer | Wafer is not processed | Wafer is assigned to this chamber | Chamber is idle | Prepare chamber and process wafer (during this time, semaphore is set) |
| 2 | Processing Chamber has a wafer | Wafer is not processed | Wafer is not assigned to this chamber | Chamber is not HIVAC and open | HIVAC and Open Chamber (set/release semaphore while in process) |

CHART 3-continued

Processing Chamber

| # | Condition 1 | Condition 2 | Condition 3 | Condition 4 | Action |
|---|---|---|---|---|---|
| 3 | Processing Chamber has a wafer | Wafer has been processed | Chamber is IDLE and implant is done | Chamber is not HIVAC and open | HIVAC and open Chamber (set/release semaphore while in process) |

The control process for the processing chamber is responsible for performing the process step assigned to the chamber, and for controlling access to the chamber by Robot 240 via use of a semaphore.

In the first rule, the control process prepares the chamber 250 and performs the processing of the wafer if there is an unprocessed wafer in it and the wafer is assigned to this chamber. In the second rule, the control process realizes that the wafer currently in the chamber 250 is not intended for this chamber. In this case, the control process rejects the wafer and opens the chamber so that the Robot 240 can remove the wafer. Finally, the third rule is executed after the chamber 250 has performed its intended function to the wafer. At this point, the chamber 250 is returned to high vacuum and opened so that the Robot 240 can access it. Similar rules exist for the other processing chambers 252, 254.

One skilled in the art will recognize that further modifications and enhancements can be added to these rules. For example, rules that handle error conditions (wafer in wrong chamber, etc) can be incorporated. In addition, the structure of the system and these rules is very conducive to scaling the system. In one such scaled embodiment, a second robot with additional processing chambers is added, such as the system shown in FIG. 1. A separate control process is preferably added to handle the actions of the second robot. Additional control processes can optionally be added to control the additional processing chambers and pass-through mechanisms. Rules, similar to those described above, are then written to control these additional components.

It should be noted that each control process is able to identify the wafer that it controls. Based on this identification, each control process is able to determine a number of pieces of information, including, but not limited to:

what process step should be performed on the wafer;
whether the wafer is currently at the right location;
what the next step for the wafer is; and
whether the wafer has completed processing.

In some embodiments, a software program, serving as a supervisory job management software program, constantly updates each wafer's processing requirement according to its respective process definition. This supervisory program is responsible for assigning the wafer's next process chamber and the next process recipe. The control rules run by each control process are being driven based on this information. This supervisory program can also change the priority of a wafer such that it enters a particular processing chamber sooner if that chamber is idle.

All cluster tool systems must have the ability to identify and track all wafers in process. The system of the present disclosure uses a centralized repository to store this wafer information. Each control process can access this repository using a system call.

To successfully track each wafer, each control process must be able to access and modify the data associated with that wafer. In other words, when a wafer is introduced into the cluster tool, each control process uses two types of procedures when interacting with the wafer identification repository. The first is a procedure to get information about the wafer, and the second is a procedure to update that information.

In one embodiment, the system uses the current location of the wafer as its identifier. For example, when the EFEM Robot 220 removes a wafer from the FOUP 210, it accesses the repository, using the FOUP and slot number to identify the wafer. The system is aware of the identity of each wafer in each FOUP and thus is able to uniquely identify a wafer simply by using the FOUP and slot numbers. The repository also contains other information about the wafer, such as the process steps and the process recipe that the wafer must undergo. Based on this data, the control process identifies where the EFEM Robot should place the wafer. When the wafer has been moved from this component, the associated control process accesses the repository and updates the location of the wafer. For example, the wafer location may change from FOUP3, slot 4 to SWLL slot 1. Using locations, it is possible to follow the path of the wafer through the cluster tool. Alternately, the wafer can be uniquely identified by its original source location, i.e. FOUP3, slot 4, throughout the entire process.

In this way, each control process can determine what the appropriate action is for any wafer that it accesses. This allows the control process to determine error conditions, next locations, completion status, and the other status needed to execute the rules enumerated above. In other words, this embodiment has one main supervisory process which continually monitors and updates the material's task list (chamber, recipe, etc) and priority. It does not manage or communicate with any of the control processes directly. The other control processes make decisions themselves based on the material's (i.e wafer's) task list.

Figure 3:
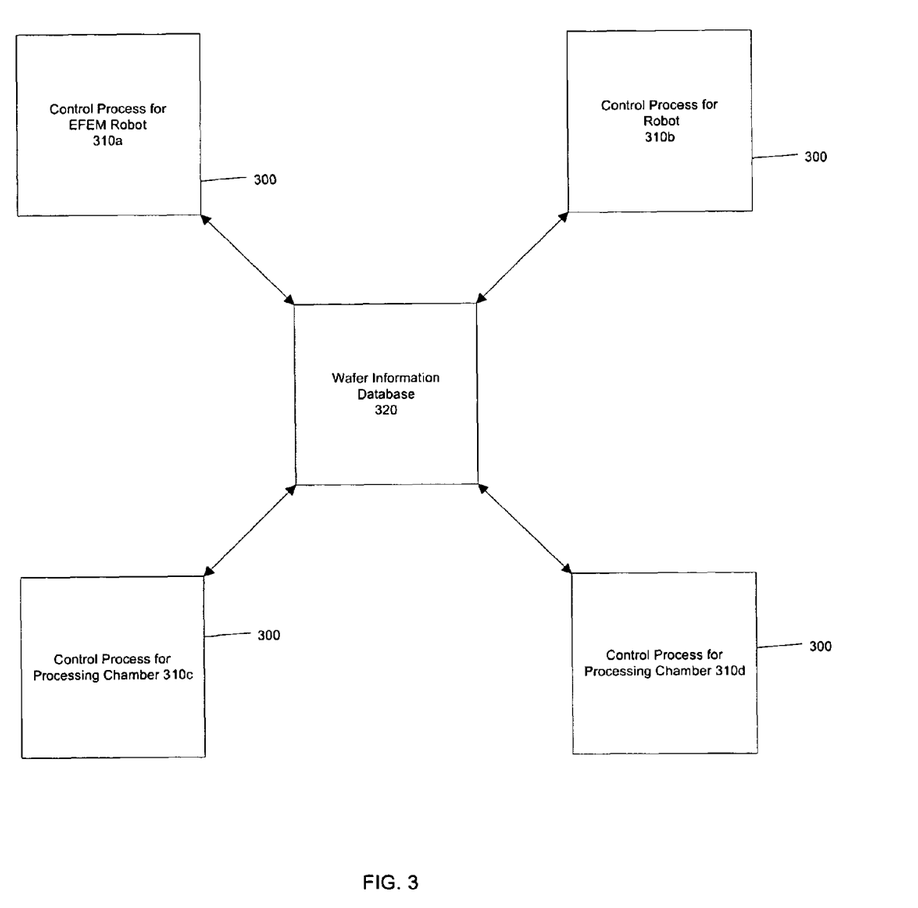
FIG. 3 represents a block diagram of one embodiment of the present system.

The control processes of the present disclosure may be implemented using a plurality of embodiments. In one embodiment, shown in FIG. 3, a separate computing device 300 executes each control process 310, operating independently from all other computing devices. In this scenario, information concerning the wafers must be retrieved from a database or other storage mechanism 320 that is accessible to all of the separate control processes. The information may reside on a shared storage array, or a separate computing device with network access to all of the control processes. Although FIG. 3 shows four control processes 310, the disclosure is not limited to any specific number of control processes.

Figure 4:
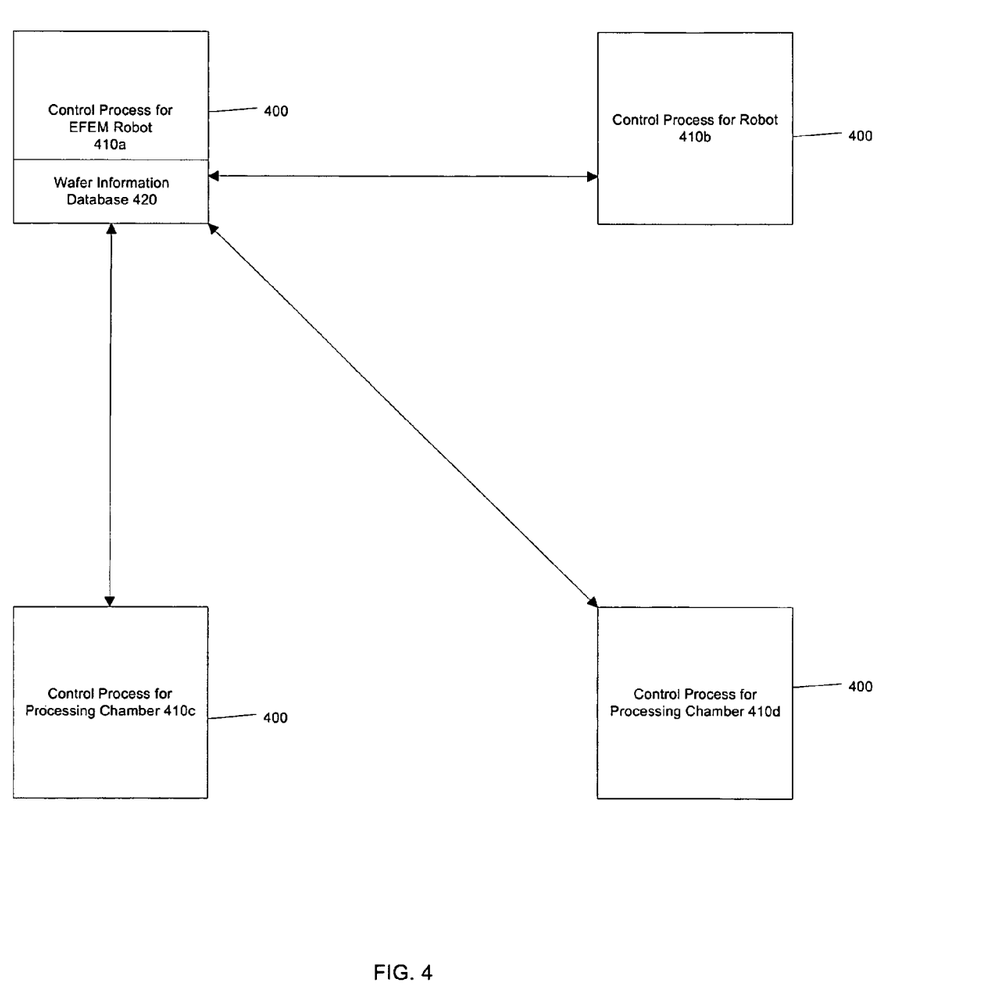
FIG. 4 represents a block diagram of a second embodiment of the present system.

In another embodiment, shown in FIG. 4, the database 420 can reside on one of the computing devices 400 used to execute a control process 410, with network access to the other control processes, resident of other computing devices 400. While FIG. 4 shows the database 420 residing on the computing device used by the control process for the EFEM Robot 410, the data could alternatively reside on any other computing device 400.

Figure 5:
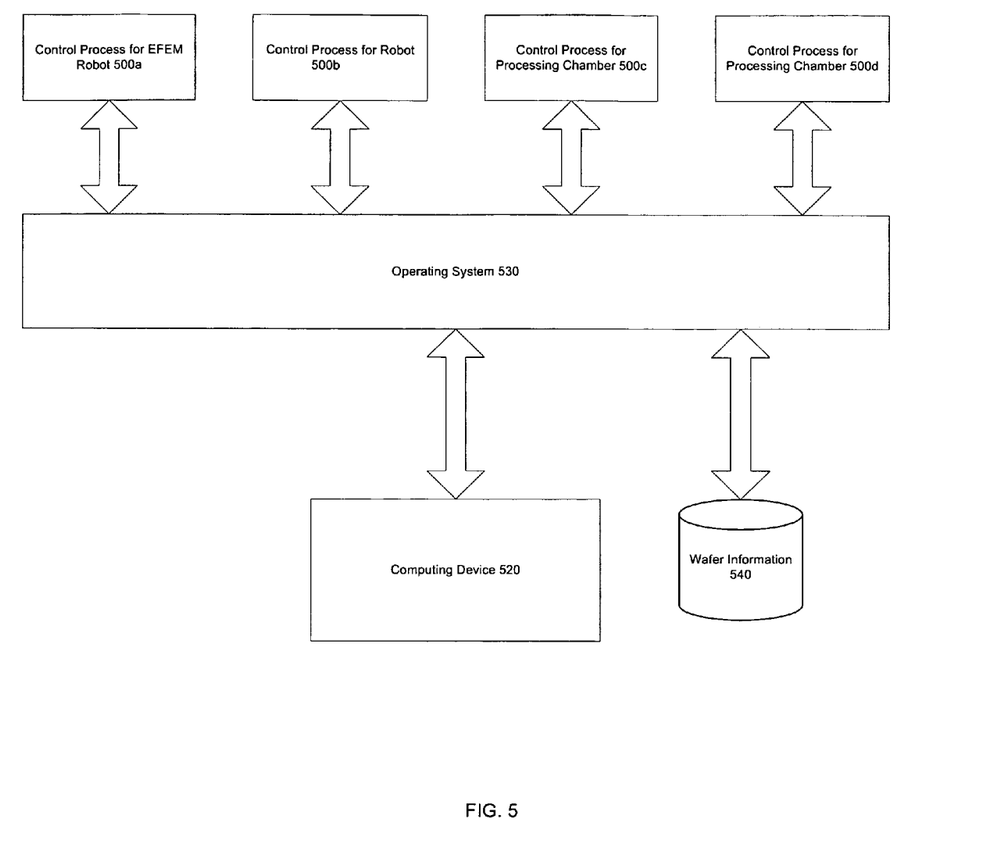
FIG. 5 represents a block diagram of a third embodiment of the present system.

In another embodiment, shown in FIG. 5, each control process is a separate software process 510, executing on a common computing device 520. In other words, each control process is a software program, which operates completely independently from the other software programs on the common computing device. In one embodiment, the computing platform is a single processor system executes a time-sharing operating system 530. In that case, these various control processes 510 are each separate processes scheduled by that operating system 530. The wafer information 540 is preferably stored on that computing device, where all control processes 510 are able to access it. There is no interaction between these programs 510, except their common access to the wafer information 540.

In another embodiment, the computing device is a multi-processor system, where each control process is a software program, assigned to a unique processor. The wafer information is stored within the computing device, where all of the control processes can access it.

Other implementations of the control processes and the wafer information storage subsystem are also possible and within the scope of the disclosure. For example, the control processes may exist as software programs on a plurality of computing devices. In other words, each control process is a software program. However, a plurality of computing devices is used to store and execute these programs. For example, the control processes for the processing chambers may be separate processes, running on a single computing device, while the control process used to control Robot 240 is executed on a different computing device. The important considerations are that the control processes only direct the activities of a subset of the components within the cluster tool, and that they are able to operate autonomously from each other. Various specific implementations are possible, such as having a single control process direct the actions of more than one component within the system, such as using a single control process to direct the actions of the first robot and the SWLL, or of the first robot and the associated processing chambers.

What is claimed is:

1. An apparatus for material handling, comprising:
    a material processing system comprising robot having direct access to a plurality of components, wherein said components are selected from the group consisting of processing chambers, orientors, pass-through mechanisms, load locks and robots;
    an autonomous rules-based control process adapted to monitor and control said robot based solely on information associated with said robot and any material in contact with said robot;
    wherein said robot moves material between said plurality of components according to rules having a fixed priority; and
    wherein said autonomous rules-based control process cooperates with others of a plurality of autonomous rules-based control processes to direct a flow of a material through said material processing system.

2. The apparatus of claim 1, further comprising a plurality of computing devices, wherein each of said plurality of computing devices executes one or more of said control processes.

3. The apparatus of claim 1, further comprising a computing device, wherein each of said plurality of control processes comprises a software program executing on said computing device.

4. The apparatus of claim 1, wherein said autonomous rules-based control process comprises a software program executing a rule-based algorithm.

5. The apparatus of claim 4, wherein said rules-based algorithm is executed deterministically.

6. The apparatus of claim 5, wherein said rules-based algorithm is executed at fixed intervals.

7. The apparatus of claim 4 wherein said rules are prioritized to optimize a system characteristic.

8. The apparatus of claim 7, wherein said characteristic comprises system throughput.

9. The apparatus of claim 7, wherein said characteristic comprises the average latency of material through system apparatus.

10. The apparatus of claim 1, wherein said system comprises a second robot having direct access a second plurality of components, wherein said components are selected from the group consisting of processing chambers, orientors, pass-through mechanisms, load locks and robots, wherein one of said second plurality of components is in direct access with and shared by said first robot, such that said first robot and said second robot cooperate to move material to said shared component.

11. The apparatus of claim 1, further comprising a storage element adapted to store information about each piece of material processed by said apparatus.

12. The apparatus of claim 11, further comprising a supervisory software program, wherein said supervisory program monitors and updates said information in said storage element.

13. The apparatus of claim 12, wherein said information comprises the priority of each piece of material.

14. The apparatus of claim 12, wherein said information comprises the processing requirements of each piece of material.

15. The apparatus of claim 11, wherein each of said autonomous rules-based control processes is in communication with said storage element.

16. The apparatus of claim 10, further comprising a storage element, in communication with said robot and said second robot, adapted to store a semaphore to control access to said shared component.

17. The apparatus of claim 16, wherein said shared component is selected from the group consisting of load locks, processing chambers and pass-through mechanisms.

18. The apparatus of claim 1, wherein said apparatus comprises a semiconductor wafer processing system.

19. The apparatus of claim 12, wherein each of said autonomous rules-based control processes is adapted to get information about said material from said storage element and to update said information.

20. The apparatus of claim 19, wherein each of said autonomous rules-based control processes determines an appropriate action for said material based on said information and said rules.

21. A method of handling material in a material processing system, comprising:
    introducing material into said system;
    using a robot having direct access to a plurality of components, wherein said components are selected from the group consisting of processing chambers, orientors, pass-through mechanisms, load locks and robots to control a flow of said material to said plurality of components, wherein an autonomous rules-based control process monitors and controls said robot based solely on information associated with said robot and any material in contact with said robot and cooperates with others of a plurality of autonomous rules-based control processes to direct said flow of said material through said system.

22. The method of claim 21, whereby each of said autonomous rules-based control processes comprises a software program executing a rules-based algorithm.

* * * * *